United States Patent
Becker et al.

(10) Patent No.: US 7,766,806 B2
(45) Date of Patent: Aug. 3, 2010

(54) METHOD FOR THE PRODUCTION OF A ROTATING MEMBER AND ROTATING MEMBER OF A PRINTING PRESS

(75) Inventors: Martin Becker, Arnstein (DE); Wolfgang Robert Josef Felgenhauer, Gemünden (DE); Karl Robert Schäfer, Rimpar (DE); Georg Schneider, Würzburg (DE)

(73) Assignee: Koenig & Bauer Aktiengesellschaft, Wurzburg (DE)

( * ) Notice: Subject to any disclaimer, the term of this patent is extended or adjusted under 35 U.S.C. 154(b) by 1296 days.

(21) Appl. No.: 10/532,866

(22) PCT Filed: Oct. 23, 2003

(86) PCT No.: PCT/DE03/03529

§ 371 (c)(1),
(2), (4) Date: Nov. 15, 2005

(87) PCT Pub. No.: WO2004/039591

PCT Pub. Date: May 13, 2004

(65) Prior Publication Data
US 2006/0150410 A1    Jul. 13, 2006

(30) Foreign Application Priority Data
Oct. 31, 2002    (DE) ................ 102 50 684

(51) Int. Cl.
*B05C 11/00* (2006.01)
*B41L 21/00* (2006.01)
*B21K 1/02* (2006.01)

(52) U.S. Cl. .............. 492/48; 492/18; 101/415.1; 101/378; 101/395

(58) Field of Classification Search ........... 101/415.1, 101/375, 378, 395; 492/48, 18
See application file for complete search history.

(56) References Cited

U.S. PATENT DOCUMENTS

| | | | | |
|---|---|---|---|---|
| 3,359,899 A | * | 12/1967 | Luehrs | 101/415.1 |
| 3,715,981 A | * | 2/1973 | Huffman | 101/415.1 |
| 3,893,394 A | * | 7/1975 | Fusco et al. | 101/415.1 |
| 4,557,196 A | | 12/1985 | Kobler | |
| 5,003,878 A | | 4/1991 | Dorow et al. | |
| 5,329,853 A | * | 7/1994 | Stegmeir et al. | 101/415.1 |
| 5,357,863 A | | 10/1994 | McLean et al. | |
| 5,396,843 A | * | 3/1995 | Durr | 101/415.1 |
| 5,402,722 A | * | 4/1995 | Schneider et al. | 101/415.1 |
| 5,461,981 A | * | 10/1995 | Schneider | 101/415.1 |
| 5,485,783 A | | 1/1996 | Rau et al. | |

(Continued)

FOREIGN PATENT DOCUMENTS

CH    422 831    4/1967

(Continued)

*Primary Examiner*—Essama Omgba
(74) *Attorney, Agent, or Firm*—Jones, Tullar & Cooper, P.C.

(57) ABSTRACT

A rotating member of a printing press is typically a cylinder that is provided with a circumferential area. A securement channel or a flow channel, which is at least partly open toward the circumferential area of the cylinder, is formed in the cylinder. A profiled member, which at least partly covers the securement channel or flow channel, with respect to its circumferential area, is inserted into the cylinder to form an integrated joint with the cylinder.

38 Claims, 4 Drawing Sheets

U.S. PATENT DOCUMENTS

| | | | |
|---|---|---|---|
| 5,488,903 A | 2/1996 | Kobler et al. | |
| 5,503,072 A * | 4/1996 | Schneider | 101/415.1 |
| 5,738,012 A * | 4/1998 | Metrope | 101/415.1 |
| 5,778,786 A | 7/1998 | Metrope | |
| 6,557,469 B1 * | 5/2003 | Schneider et al. | 101/415.1 |
| 6,561,094 B1 * | 5/2003 | Schneider et al. | 101/415.1 |
| 6,675,708 B2 * | 1/2004 | Schneider et al. | 101/415.1 |
| 6,862,991 B2 * | 3/2005 | Schafer | 101/415.1 |
| 6,901,857 B2 * | 6/2005 | Tezenas du Montcel | 101/415.1 |
| 7,234,397 B2 * | 6/2007 | Schafer | 101/415.1 |
| 7,302,889 B2 * | 12/2007 | Schafer | 101/415.1 |
| 2004/0050276 A1 * | 3/2004 | Schafer | 101/415.1 |
| 2009/0139419 A1 * | 6/2009 | Zahnd | 101/378 |
| 2009/0173247 A1 * | 7/2009 | Bachmeir et al. | 101/415.1 |

FOREIGN PATENT DOCUMENTS

| | | |
|---|---|---|
| DE | 57 859 | 10/1967 |
| DE | 53 706 | 11/1967 |
| DE | 66 630 | 5/1969 |
| DE | 37 38 568 | 5/1989 |
| DE | 43 19 167 C2 | 4/1995 |
| DE | 196 19 941 A1 | 1/1997 |
| DE | 191 11 642 A1 | 10/1997 |
| DE | 196 11 642 A1 | 10/1997 |
| DE | 196 11 642 C2 | 7/2002 |
| GB | 1055329 | 1/1967 |
| GB | 2274623 | 8/1994 |
| JP | 60-145849 | 8/1985 |
| JP | 4-130839 | 12/1992 |
| JP | 8-290690 | 11/1996 |
| JP | 9-216333 | 8/1997 |
| WO | WO 95/32096 | 4/1995 |

* cited by examiner

METHOD FOR THE PRODUCTION OF A ROTATING MEMBER AND ROTATING MEMBER OF A PRINTING PRESS

CROSS-REFERENCE TO RELATED APPLICATIONS

This patent application is the U.S. national phase, under 35 USC 371, of PCT/DE2003/003529, filed Oct. 23, 2003; published as WO 2004/039591 A1, published May 13, 2004, and claiming priority to DE 102 50 684.1 filed Oct. 31, 2002, the disclosures of which are expressly incorporated herein by reference.

FIELD OF THE INVENTION

The present invention is directed to a method for producing a rotating body, and to a rotating body of a printing press. The rotating body, which typically is a cylinder, has a barrel with a profiled body arranged in a groove formed on a shell face of the barrel.

BACKGROUND OF THE INVENTION

A device for fastening a dressing on a printing group cylinder is known from DE 196 11 642 C2. A prefabricated strip is placed into a groove that is formed in the surface area of the cylinder and is welded together with it at joining surfaces which are facing each other in the circumferential direction of the cylinder. The strip completely fills the groove. Bores for conducting suction air, and a slit-shaped bracing pit for holding a dressing arranged on an angled-off end are embodied in the strip.

SUMMARY OF THE INVENTION

The object of the present invention is directed to providing a method for producing a rotating body, and to a rotating body of a printing press.

In accordance with the present invention, this object is attained by producing a rotating body of a printing press and having a barrel with a profiled body. The profiled body is arranged in a groove that is formed on an outer a shell face surface of the barrel of the rotating body. The profiled body has an outer profiled body surface and is connected with the barrel by welding, soldering or glueing. The profiled body at least partially bridges the groove at the outer shell surface of the rotating body barrel. After the profiled body is secured in the groove, with the outer profiled body surface being located adjacent the outer shell face surface, a corrosion-proof protective layer is applied to the shell face of the barrel. A covering made of a corrosion-proof material can also be applied.

The advantages which can be gained by the present invention consist, in particular, in that, for forming a bracing channel or a flow channel, it is possible to cut a groove into the surface of the barrel of the base body, for example by milling, which is a cost-effective method for the desired production. Expensive deep hole drilling is not necessary. A profiled body which is covering and delimiting the bracing channel or the flow channel toward the shell face or the surface of the base body, is introduced into the groove and is connected with the barrel or with the base body by being incorporated into the material. Electron beam welding or laser welding, which methods are preferred for making the connection, permit heating the barrel or the base body in a locally very narrowly limited welding zone. The barrel of the base body thus remains free of tension and free of warping in spite of the introduction of heat. Furthermore, fastening of the profiled body on the barrel or on the base body by the use of screws or similar connecting elements can be avoided. Sealing of the heads of these fastening elements in the bracing channel or in the flow channel, as well as sealing of a passage hole in the profiled body for the attachment of such connecting elements, can also be avoided. It is also advantageous in connection with the present invention that a barrel or a base body, which may be made of a less corrosion-resistant material, can be protected against corrosion by welding a cover, which cover is, for example, plate-shaped, and which may be made of a more corrosion-resistant material, onto it. In the same way, the shell face of the barrel or the surface of the base body can also be configured to be more wear-resistant. By their advantageous placement in the barrel or base body, the flow channels make possible an efficient temperature control.

BRIEF DESCRIPTION OF THE DRAWINGS

Preferred embodiments of the present invention are represented in the drawings and will be described in greater detail in what follows.

Shown are, each in partial cross-section, in.

DESCRIPTION OF THE PREFERRED EMBODIMENTS

Figure 1:
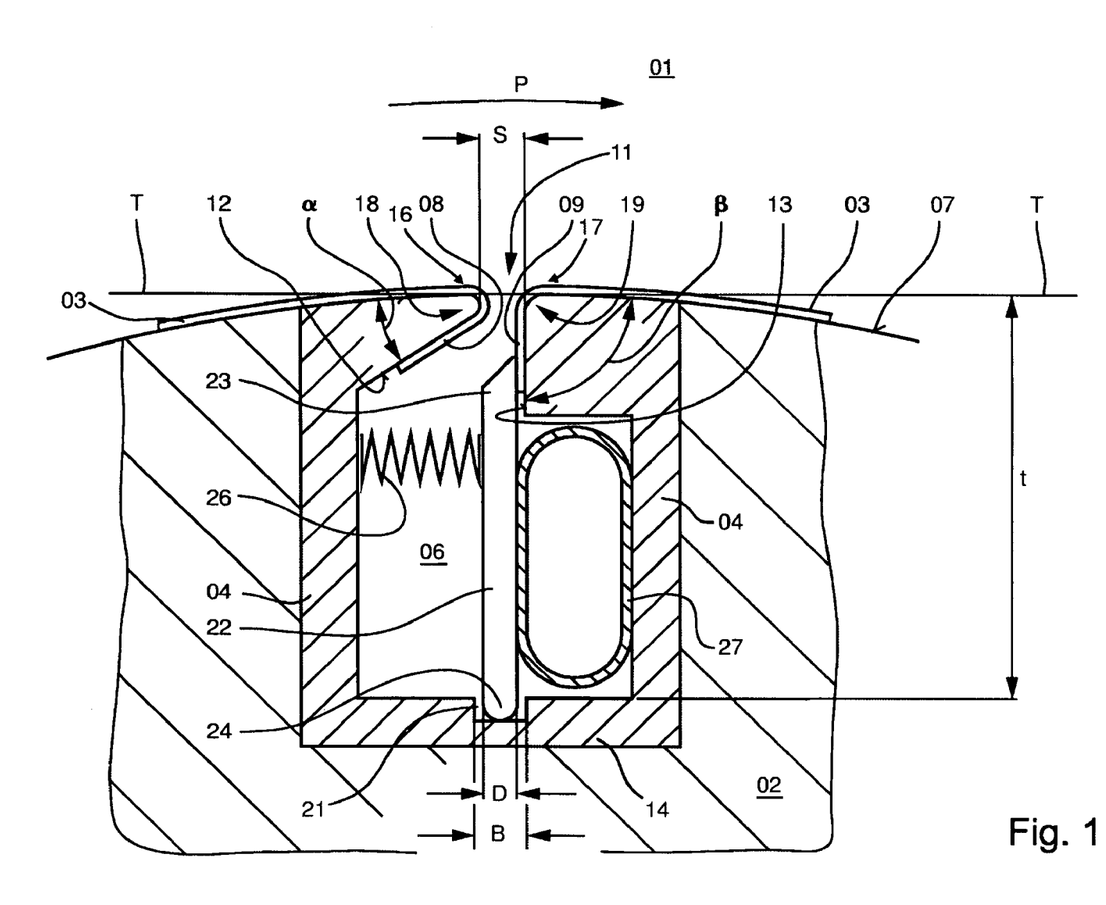
FIG. 1, a profiled body introduced into a barrel of a rotating body, and with a bracing channel extending in it, FIG. 2, a rotating body with a profiled body welded to the barrel.

Referring initially to FIG. 1, there may be seen generally at 01 a rotating body, such as a cylinder of a rotary printing press, in accordance with the present invention. If, for example, the rotating body 01 is configured as a forme cylinder 01 or as a transfer cylinder 01 of a printing group, this cylinder 01 can be covered, in the direction of its circumference with, for example, one dressing 03 or two dressings 03, and axially, over its length, with, for example, up to six dressings 03. In connection with the use of body 01 as a forme cylinder 01, the dressings 03 are typically embodied as plate-shaped printing formes 03. If the rotating body 01 is a transfer cylinder 01, the dressings 03 are preferably rubber printing blankets 03, which are applied to a support plate. As a rule, a plate-shaped printing forme 03, or a support plate for a rubber printing blanket is made of a flexible, but otherwise dimensionally-stable material, such as, for example an aluminum alloy.

The printing group in which the above-described cylinder 01 is employed can be configured, for example, as a 9-cylinder satellite printing unit, in which four cylinder pairs, each consisting of a forme cylinder 01 and a transfer cylinder 01, are all arranged around a common counter-pressure cylinder. At least the forme cylinders 01 of the four pairs can each have the characteristics for the attainment of the object of the present invention, as described here. Arrangements are advantageous, in particular for use in printing newspapers, in which a forme cylinder 01 is covered in its axial direction, with up to six plate-shaped printing formes 03 arranged side by side, and along its circumference either with one plate-shaped printing forme 03 or, with two plate-shaped printing formes 03 arranged one behind or after the other in the circumferential direction. Such a forme cylinder 01 rolls off on a transfer cylinder 01 which, for example, is covered with up to three side-by-side axially arranged rubber printing blankets 03, and wherein each such rubber printing blanket 03 stretches over or encompasses the full circumference of the transfer cylinder 01. Thus, the rubber printing blankets 03 have twice the width and twice the length of the cooperating plate-shaped printing formes 03 of the forme cylinder. In this case, the forme cylinder 01 and the transfer cylinder 01 preferably have the same geometric dimensions, with respect to their axial length and their circumference. For example, a rotating body 01, which is embodied as a cylinder 01, has a diameter of, for example, from 140 mm to 420 mm, preferably between 280 mm and 340 mm. The axial length of the barrel 02 of the cylinder 01 lies, for example, in the range of from 500 mm to 2400 mm, and preferably is between 1200 mm and 1700 mm. Alternatively to the configuration of the rotating body 01 as a cylinder 01, it can also be structured as a roller 01, which roller preferably guides a material to be imprinted, such as, for example, paper.

A partial cross-section of a barrel 02 of the rotating body 01 is represented in FIG. 1, and in which a bracing or securement channel 06 extends in the axial direction of the barrel 02. The bracing or securement channel 06 is delimited, at least in the direction of a shell face 07 of the barrel 02, by at least one profiled body 04 that is introduced into the barrel 02. A dressing 03, such as, for example, a flexible plate-shaped printing forme 03, is fastened on the shell face 07 of the barrel 02. Angled or beveled end legs 08, 09, which are formed at the ends of the dressing 03, are introduced into the bracing or securement channel 06, which has an opening 11 that is directed toward the shell face 07 of the barrel 02. These end legs 08, 09 are then substantially placed against walls 12, 13 of the opening 11 which walls 12, 13 are situated close to the shell face. In this case, the bracing or securement channel 06 can have various cross-sectional geometric shapes without departing from the spirit and scope of the present invention.

Without limiting the present invention to the following simplified representation, the description of the present invention is provided here, for the sake of simplicity, in such a way as if only a single dressing 03 extending around the barrel 02 were to be fastened on the barrel 02 of the rotating body or cylinder 01. For one of skill in the art, it is easily understandable that several such dressings 03 could be fastened on the barrel 02 in its axial direction, as well as in its circumferential direction. In the case of several such dressings 03 positioned on the barrel 02, in the circumferential direction of the rotating body on cylinder 01, several bracing channels 06 would also have to be provided.

Viewed in the production direction P of the rotating body 01, as seen in FIG. 1, the dressing 03 to be fastened on the barrel 02 has a leading end 16 and a trailing end 17, with respective beveled off or angled end legs 08, 09. As also viewed in the production direction P of the rotating body 01, the opening 11 of the bracing or securement channel 06 has a front edge 18, from which a wall 12 extends in the direction toward the bracing or securement channel 06, as well as a rear edge 19, from which a wall 13 also extends in the direction toward the bracing channel 06. The opening 11 is configured being axially elongated and circumferentially narrow, and is therefore slit-shaped, in the shell face 07 of the barrel 02, wherein a slit width "S" of the opening 11 is short in comparison with a depth "t" of the bracing channel 06, which depth "t" can be, for example, 28 mm to 35 mm, and which preferably is 30 mm, and which depth "t" is dimensioned in such a way that a leg 08 at the leading end 16 of a dressing 03, and a leg 09 at the trailing end 17 of the same dressing 03 or, in the situation with several dressings 03 fastened in the circumferential direction of the rotating body 01, or a leg of an identical dressing 03, can be arranged in the opening 11 with the dressings situated circumferentially one behind the other. Slit widths "S" of less than 5 mm, and preferably in the range of 1 mm to 3 mm, are advantageous. Therefore, the ratio of the depth "t" of the bracing or securement channel 06 to the slit width "S" preferably is approximately between 1:10 and 1:15. The opening 11 can extend completely, or only partially, over the axial length of the barrel 02.

An acute opening angle α, which lies between 30° and 60°, and which lies preferably at 45°, is formed between the wall 12 extending from the front edge 18, in the direction toward the interior of the bracing channel 06, and an imaginary tangent line T resting on the opening 11 in the shell face 07 of the rotating body 01. Thus, the slit width "S" of the opening 11 tapers, or decreases in the radial direction toward the shell face 07 of the rotating body 01 and increases in the radial direction toward the interior of the bracing channel 06. The leg 08 at the leading end 16 of the dressing 03 can be suspended from the front edge 18 of the opening 11, so that this leading end leg 08 rests, preferably in a positively connected manner, against the leading wall 12 extending from the front edge 18 of the opening 11 to the interior of the bracing channel 06. In the example which is represented in FIG. 1, the trailing or rear wall 13, located at the rear edge 19 of the opening 11, drops approximately vertically in the radial direction of body 01 toward the interior of the bracing channel 06. However, the trailing or rear wall 13 can be slightly inclined, so that the opening 11 widens in the direction toward the bracing channel 06. An angle β, which results as the opening angle between the wall 13 extending from the rear edge 19 to the bracing channel 06 and the previously-mentioned tangent line T resting on the opening 11 in the shell face 07 of the rotating body 01, for example lies within the range of 85° and 95° and preferably is 90°.

As a rule, the bracing or securement channel 06 extends in the axial direction of the rotating body 01. A groove 21, which, for example, has been cut into a bottom portion 14 of the bracing channel 06 or of the profiled body 04, is open toward the bracing channel 06, and into which groove 21 the lower or inner end of a rigid, preferably plate-shaped holding member 22 has been placed, preferably loosely, and pivotably seated. The holding member 22 is preferably seated approximately diametrically opposite the slit-shaped opening 11. For example, the holding member 22 can be a metallic strip 22 extending longitudinally in the bracing or securement channel 11. The groove 24 is both a seating point and a support point for the holding member 22 which can be configured as a lever 22. In order to be able to pivot the holding member 22 in the groove 21, the width B of the groove 21 is greater than the thickness D of the holding member 22. The holding member 22 is structured in such a way that it has a first, upper or outer end 23, which can be placed against one of the two walls 12 or 13 of the opening 11, and a second, lower or inner end 24 located opposite the opening 11, wherein this lower end 24 is supported in the groove 11.

A spring 26, which preferably is prestressed, is supported by one of its ends on the profiled body 04 and by its other end on the holding member 22, preferably close to the first, upper end 23 of the holding member 23, so that the holding member 22, which is structured as a lever 22, forms as long as possible a lever arm from its seating point in the groove 21 to the spring 26. An actuating element 27 counteracts, when needed, the contact pressure that is exerted by the spring 26, via the holding member 22, on the wall 13 extending from the rear edge 19 of the opening 11. In order to release a clamping force exerted on the wall 13 and provided by the holding member 22, the actuating element 27 can be operated. The actuating element 27 preferably is a hose 27 extending in the longitudinal direction of the bracing or securement channel 06, which hose 27 can be charged with a pressure medium, such as, for example, compressed air. All of the components, which are required for maintaining a dressing 03 on the shell face 07 of the barrel 02, are arranged and seated in the bracing or securement channel 06.

The explanations provided hereinabove, with respect to the construction and the use or employment of the rotating body 01, are intended to apply, in a corresponding manner, to all of the embodiments of the present invention to be hereinafter described.

Figure 2:
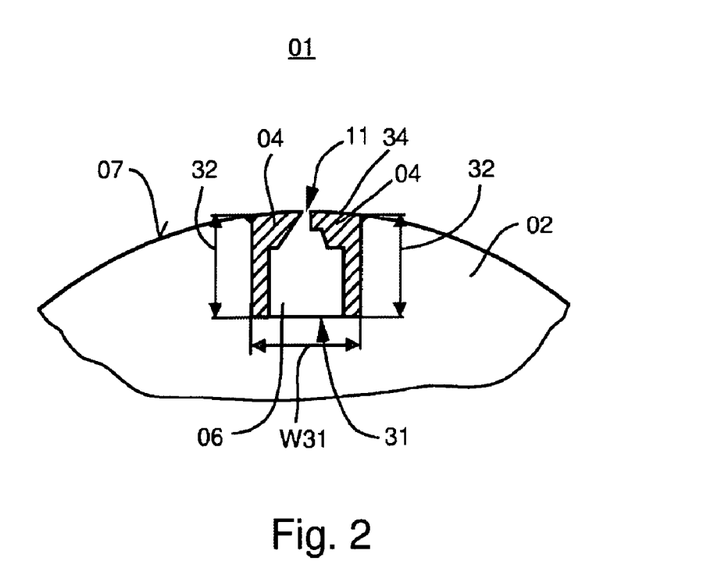
Figure 3:
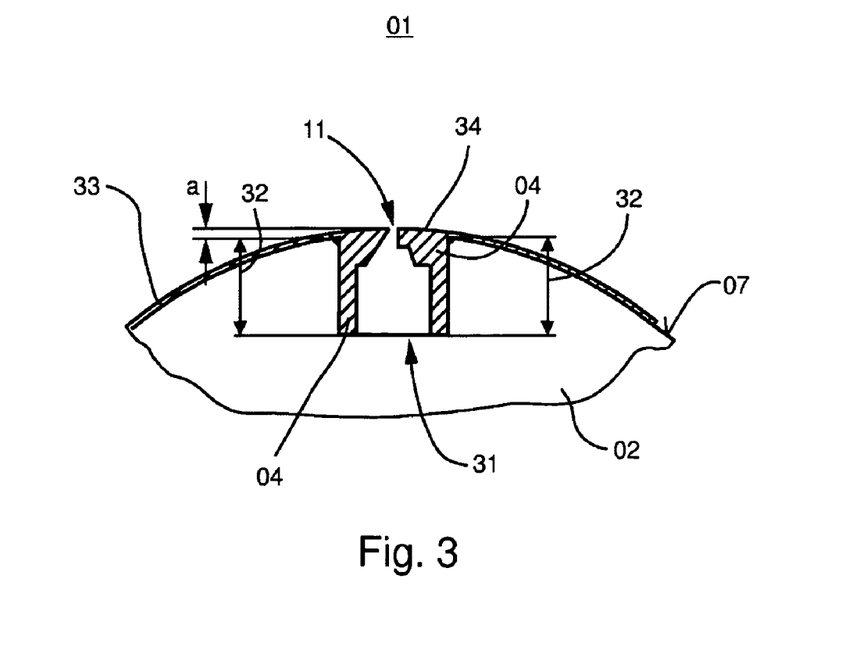
FIG. 3, a rotating body with a profiled body welded to the barrel and with a protective layer applied to the barrel.

In a first embodiment of the present invention, as represented in FIG. 2, for producing the rotating body 01, at least one profiled body 04 is inserted into the barrel 02 of the rotating body or cylinder 01 in such a way that the profiled body 04 spatially delimits or defines a bracing or securement channel 06 at least on the shell face 07. The introduction and retention of the profiled body 04 into the barrel 02 is preferably provided by material-to-material contact, and in particular is provided by a welding process, such as, for example, by electron beam welding or by laser welding. As an alternative to a welding method, it would also be possible to apply hard soldering in a vacuum, wherein a soldering paste applied to the joining surface is spread as a result of capillary action and, in the end, results in a very solid soldered connecting, even under shearing stress, if the complete rotating body 01 is heated in a vacuum. Independently of the connecting techniques being used in the discussion which follows, for introducing the profiled body 04 into the rotating body 01, advantageously the profiled body 04 is inserted into a groove or channel 31 preferably machined into the shell face 07 of the barrel 02. If the profiled body 04 is embodied in a block shape, a width W31 of the groove or channel 31 and a width of the profiled body 04 are matched to each other, preferably in a mariner that will provide clearance fit or a transition fit, so that they are joined easily. The profiled body 04 extending in the axial direction of the rotating body 01 preferably has a strip-like shape and can be embodied in one piece or in several pieces. As illustrated in FIGS. 2 and 3, it is not absolutely necessary, for example, that the profiled body 04 include a portion which forms a bottom in the bracing or securement channel 06. As an alternative to the provision of a profiled body 04 as a molded piece, the profiled body 04 can be formed on or near the shell face 07 of the barrel 02, in a welding-on process, by the application of a material. A corrosion-resistant special steel is particularly suitable for use as the material usable for forming a profiled body 04 which is produced by welding techniques. The holding member 22, which is arranged in the bracing or securement channel 06, the spring 26 and the actuating element 27, are no longer represented in FIG. 2 and the subsequent drawing figures for reasons of clarity. Reference is made to FIG. 1 for details of the structure of these elements. The width W31 of the groove 31 can be, for example, from 10 mm to 50 mm, and will preferably lie between 12 mm and 30 mm, at least at the shell face 07.

To provide an access to the interior of the bracing or securement channel 06, the profiled body 04 has, for example, a slit-shaped opening 11 in its side facing the shell face 07, i.e. at its front or outer end 34. Alternatively, two separate profiled bodies 04 can be provided, which by their spacing in the circumferential direction of the rotating body 01, form a slit-shaped opening 11, at least at the shell face 07. Preferably, the cross section of the bracing or securement channel 06 can be round or can be rectangular. The bracing or securement channel 06 preferably extends in the axial direction of the rotating body 01, The profiled body 04 can be embodied in a strip shape and, taken in a sectional view transversely to the axial direction of the rotating body 01, is substantially angular.

Welding zones 32, which have only a very narrow width in the direction of the circumference of the barrel 02, but which project into the barrel 02 over a large portion of the structural depth of the profiled body 04, are, for example, located at a lateral joining surfaces formed between the profiled body 04 inserted into the groove 31 and the barrel 02. By bundling the radiation which is emitted by the respective energy sources of the electron beam welding or laser beam welding processes, these suggested welding processes make possible a tightly controlled, locally limited heating of the barrel 02 with a large depth effect. Thus, with electron beam welding, the width of each welding zone 32 is, of, for example, 1 mm, in connection with a welding depth of 5 mm directed into the barrel 02, is of, for example, 2 mm in connection with a welding depth of 20 mm, and is of, for example, 3 mm in connection with a welding depth of 40 mm. With laser welding, the welding zones 32 are somewhat wider, so that the width and depth of each welding zone 32 have a ratio of approximately 1:5. For the application contemplated here, welding depths of 15 mm to 20 mm could be sufficient. The maximally required depth, for example, lies at 50 mm.

It is advantageous for the welding being used to embody at least one area of the joining surfaces, close to the shell face 07, and between the barrel 02 and the profiled body 04, which is arranged in the groove 31, with smooth walls and without a curvature when considered in a sectional view taken transversely to the axial direction of the rotating body 01. For example, the welding zones 32 can extend approximately vertically, with respect to the shell face 07 of the barrel 02 and can therefore be arranged, approximately radially, with respect to the rotating body 01. With respect to the shell face 07 of the barrel 02 these welding zones 32 have a purposely selected angle of inclination, which angle of inclination is a function of the geometry of the profiled body 04. In any case, the welding zones 32 enter the barrel 02 in straight lines corresponding to the beam path from the energy source. The welding zones 32 need not necessarily extend over the entire length of the barrel 02. Instead, they can be formed as points or in several short sections, which are spaced apart from each other, and being of only a few millimeters in length. The welded sections can be, for example, from 5 mm to 25 mm long, and preferably are approximately 10 mm long and can be repeated at spaced distances of, for example, 20 mm to 50 mm, and preferably of 30 mm to 40 mm, in the axial direction of the rotating body 01. Alternatively to the above-described, preferred welding process, and in particular to the preferred electron beam welding method or the laser beam method, it is also possible to glue the profiled body 04 into the barrel 02. Even arched joining surfaces between the barrel 02 and the profiled body 04 pose no problems in the case of gluing.

The profiled body 04 and the barrel 02 can be made of completely different materials. Thus, a corrosion-resistant material is preferably selected for the profiled body 04, such as, for example, an alloyed corrosion-proof steel or an aluminum bronze, while the barrel 02 can, for example, consist of unalloyed C22 steel, and therefore can consist of a material which is more susceptible to corrosion. The embodiment of the invention, in particular with the rotating body 01 of different corrosion behavior, leads to a second embodiment wherein it can be advantageous to place the at least one profiled body 04 into the groove 31 with a slight protrusion "a," or to form it on the groove 31 with a slight protrusion "a," as seen in FIG. 3 and wherein the protrusion "a" is measured as a few tenths of millimeters so that the profile body 04, when it is inserted into the groove 31, protrudes only slightly past the shell face 07 of the barrel 02 by the extent of the protrusion "a". Advantageously, a corrosion-proof protective layer 33 is applied to the shell face 07 of the barrel 02 which barrel 02 can be, for example, made of an inexpensive unalloyed C22 steel, wherein the protective layer 33 can be made of, for example, a coating on the basis of nickel or iron-austenite-cobalt, which coating can be applied by a high-speed flame-spraying method, or a coating of titanium oxide, which can be applied by a flame-spraying method. This protective layer 33 can also completely or partially cover the front or outer face 34 of the profiled body which is oriented toward the shell face 07 of the barrel 02. Following the application of the protective layer 33, the entire coated shell face 07 of the barrel 02 is preferably re-surfaced or re-ground. The protective coating 33 is thus either completely removed or is partially removed from the front or outer face 34 of the profiled body 04. A continuous, smooth transition from the profiled body 04 to the shell face 07 of the barrel 02 is assured by this re-surfacing or re-grinding. With this embodiment of the rotating body 01, in accordance with the present invention, a dressing 03 applied to the barrel 02 comes into contact only with corrosion-proof surfaces, because the shell face 07 of the barrel 02, as well as the profiled body 04, are both embodied to be corrosion-proof, at least at the contact faces with the dressing 03.

Figure 4:
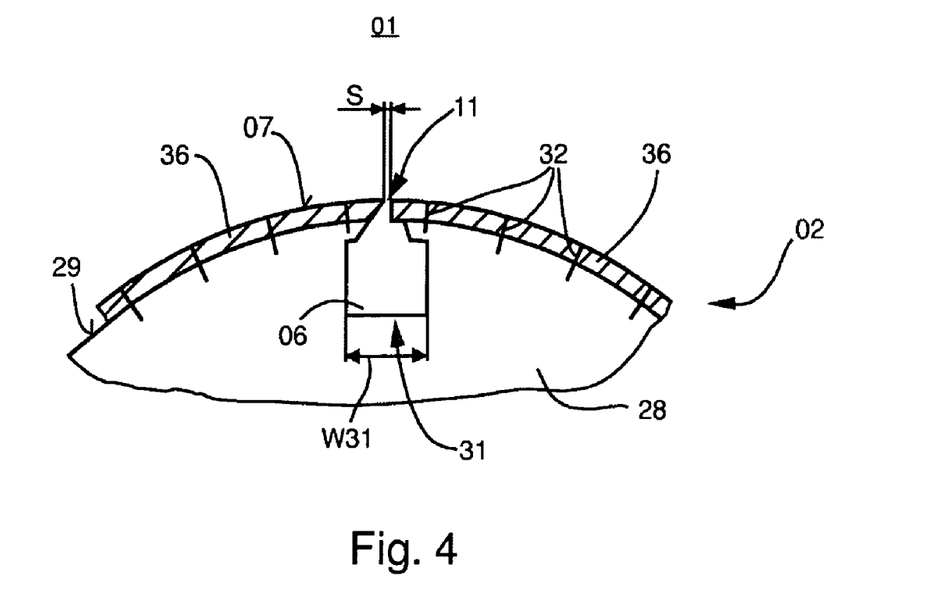
FIG. 4, a rotating body with a cover applied to the base body.

A third preferred embodiment of the rotating body 01 in accordance with the present invention is illustrated in FIG. 4. A covering 36 has been applied to a surface 29 of a base body 28 of the barrel 02. The base body 28, together with its surface 29, can be made of a relatively corrosion-prone, low-cost material, such as, for example, an unalloyed C22 steel. In contrast, the covering 36 consists of a more corrosion-resistant material, such as, for example, an alloyed, corrosion-proof steel, which covering 36 is applied, by material-to-material contact, to the surface 29 of the base body 28, and preferably is welded on, in particular by the use of electron beam welding or laser welding. Because of their depth effects, these preferred welding processes make it possible to perform welding through the covering 36, whose radial material thickness is only a few millimeters, and is preferably 10 mm at most, and in this way to provide a permanent solid connection of the covering 36 with the surface 29 of the base body 28. Welding zones 32, which are extending into the base body 28, and which are represented, in a simplified manner in FIGS. 4 to 6, by lines, are embodied to be preferably spaced equidistant along the circumference of the barrel 02, or its base body 28.

The bracing or securement channel 06, which preferably extends in the axial direction of the length of the barrel 02 can, as is represented in FIG. 4, be cut directly into the base body 28. Alternatively, it can be embodied in the manner described previously in connection with FIG. 2, together with a profiled body 04, wherein the profiled body 04 is non-detachably connected with the base body 28, advantageously by material-to-material contact, and preferably by the use of a welding process, such as, in particular, by the use of electron beam welding or laser welding, or by gluing. Regardless of the cutting, or insertion of the bracing or securement channel 06 in the base body 28, the covering 36 has a slit-shaped opening 11 facing toward the bracing or securement channel 06 at all functionally required locations. This opening 11 is cut, preferably by the use of milling, into the covering 36, and preferably after the covering 36 has been applied to the surface 29 of the base body 28. Thus, the slit-shaped opening 11 is cut into the covering 36 and functions, at least as a part of a holding device, wherein a dressing 03, which can be placed on the surface 29, can be held by the holding device. FIG. 1 shows a detailed example for the holding device, and reference is made to the associated description for further details of the holding device, which is discussed in detail in a previous section of the specification. After the opening 11 has been cut into the covering 36, the bracing or securement channel 06 can be formed, for example, in the base body 28, provided that the newly-formed opening 11 does not provide access to a bracing channel 06 already existing in the base body 28. The slit width "S" of the opening 11 preferably lies within the range of a few millimeters, preferably it is 5 mm at most, and in particular it is from 1 mm to 3 mm, as seen in FIG. 1. The opening 11 can extend over the entire length of the barrel 02, or may extend only over portions of this length.

Figure 5:
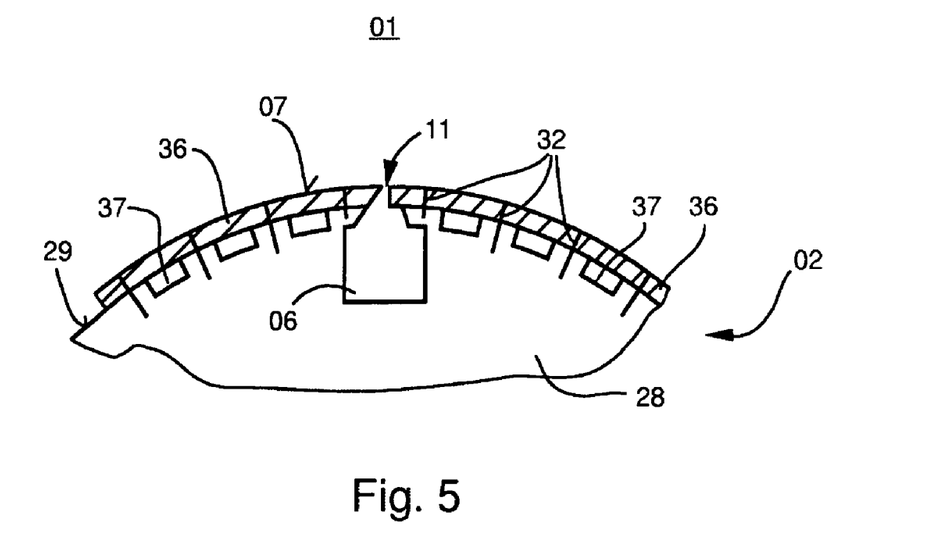
FIG. 5, a rotating body with a cover applied to the base body, and with flow channels also formed in the base body in addition to the bracing channel.

If the bracing or securement channel 06 is embodied in the manner previously described in connection with FIG. 2 in the base body 28, FIGS. 4 and 5 show a special embodiment of the groove 31 which has been cut into the base body 28 and into which groove 31 a profiled body 04 has been inserted. The groove 31, as shown in FIGS. 4 and 5, has an undercut in the base body 28. Such a shape of the groove 31 can be cut into a base body 29 by the use of, for example, a T-shaped milling device. The advantage of the undercut shape of the groove 31 lies in that a profiled body 04, which has been pushed into the base body 28, for example in the axial direction of the rotating body 01, is secured against unintentional removal from the groove 31, in the radial direction of the rotating body 01, by the undercut.

It can also be seen in FIG. 4 that the covering 36, which closes the barrel 02 on its shell face 07, has an opening 11 with a slit width "S" which is of reduced circumferential width in comparison with the width W31 of the groove 31. Preferably, the ratio of the width W31 of the groove 31 and the slit width "S" of the opening 11 lies between 5:1 and 15:1. As previously mentioned, the slit-shaped opening 11 can be cut into the covering 36 after the covering 36 has been applied to the surface 29 of the base body 28. At this slit-shaped opening 11, the front edge 18 of the opening 11, as described in connection with FIG. 1, and with the wall 12 extending from this edge 18 at the angle α in the direction toward the bracing channel 06, as well as the rear edge 19, with the wall 13 extending approximately vertically in the direction toward the bracing channel 06, are embodied or are formed at this opening 11. Reference is made to FIG. 1 for a showing of further details of the configuration of this opening 11.

In a fourth preferred embodiment of the present invention, as can be seen in FIG. 5, a flow channel 37, in particular an axially extending coolant channel 37, which is open in the direction toward the shell face 07 of the barrel 02, can be cut in the base body 28, which flow channel 37 is then covered by the covering 36 which is applied to the surface 29 of the base body 28. Several such axially extending flow channels 37 are advantageously provided spaced about the circumference of the base body 28, which plurality of flow channels 37 are preferably spaced apart equidistantly from each other and which have a rectangular-shaped cross section, for example.

Flow channels 37, configured in this way, can be cut into the base body 28 by milling, for example by the use of a disk milling cutter.

To control the temperature of the shell face 07, a liquid heat-carrying medium, such as, for example, water or oil, can flow through the flow channels 37. It is advantageous to at least partially line the flow channels 37 with a plastic material, at least at the contact points with the base body 28, in particular, for thermally insulating the heat-carrying medium flowing through the flow channels 37 with respect to the base body 28. Because the flow channels 37, in this embodiment of the rotating body 01, can be arranged very closely to its shell face 07, it is possible to realize a very efficient temperature control, particularly if, in addition, the covering 36 is thin-walled, so that it is made only a few millimeters thick, and preferably at most is 10 mm thick. As FIG. 5 shows, it is possible to form at least one bracing or securement channel 06, as well as at least one flow channel 37, or several such flow channels 37, in a barrel 02, or in its base body 28, which channels 37 preferably extend parallel with each other and in the direction of the length of the barrel 02, or of its base body 28. In the case of the provision of several flow channels 37, a welding zone 32 is preferably formed between each one of adjoining flow channels 37. A welding zone 32 is preferably also formed between a bracing or securement channel 06 and an adjoining flow channel 37. It is advantageous to arrange or to space the welding zones 32 in an equidistant manner along the circumference of the barrel 02. Because of the employment of welding methods with very narrowly restricted heating zones, the channels 06, 37 can be arranged closely next to each other at the circumference of the barrel 02. Welding methods with very narrowly restricted heating zones also have the advantage that, in spite of their heat-producing production methods, the rotating body 01 remains practically free of warping. Even linings made of plastic, and applied in the flow channels 37, are not deformed by the supply of heat in the above-described preferred welding process.

The covering 36 is preferably embodied as a tube-shaped hollow body which can be pushed onto the base body 28 for its assembly. However, the covering 36 can also be configured in the form of a shell, in particular in several sections, wherein several arc-shaped segments are applied, in the direction of the circumference, to the surface 29 of the base body 28. It is possible by the application of the covering 36, which covering is preferably made of a corrosion-proof and advantageously also of a wear-proof material, to provide a finished shell face 07 by an advantageous manufacturing technique for the base body 28 of the rotating body 01, which base body 28 is, for example, made of a less expensive, unalloyed and not corrosion-proof material.

Figure 6:
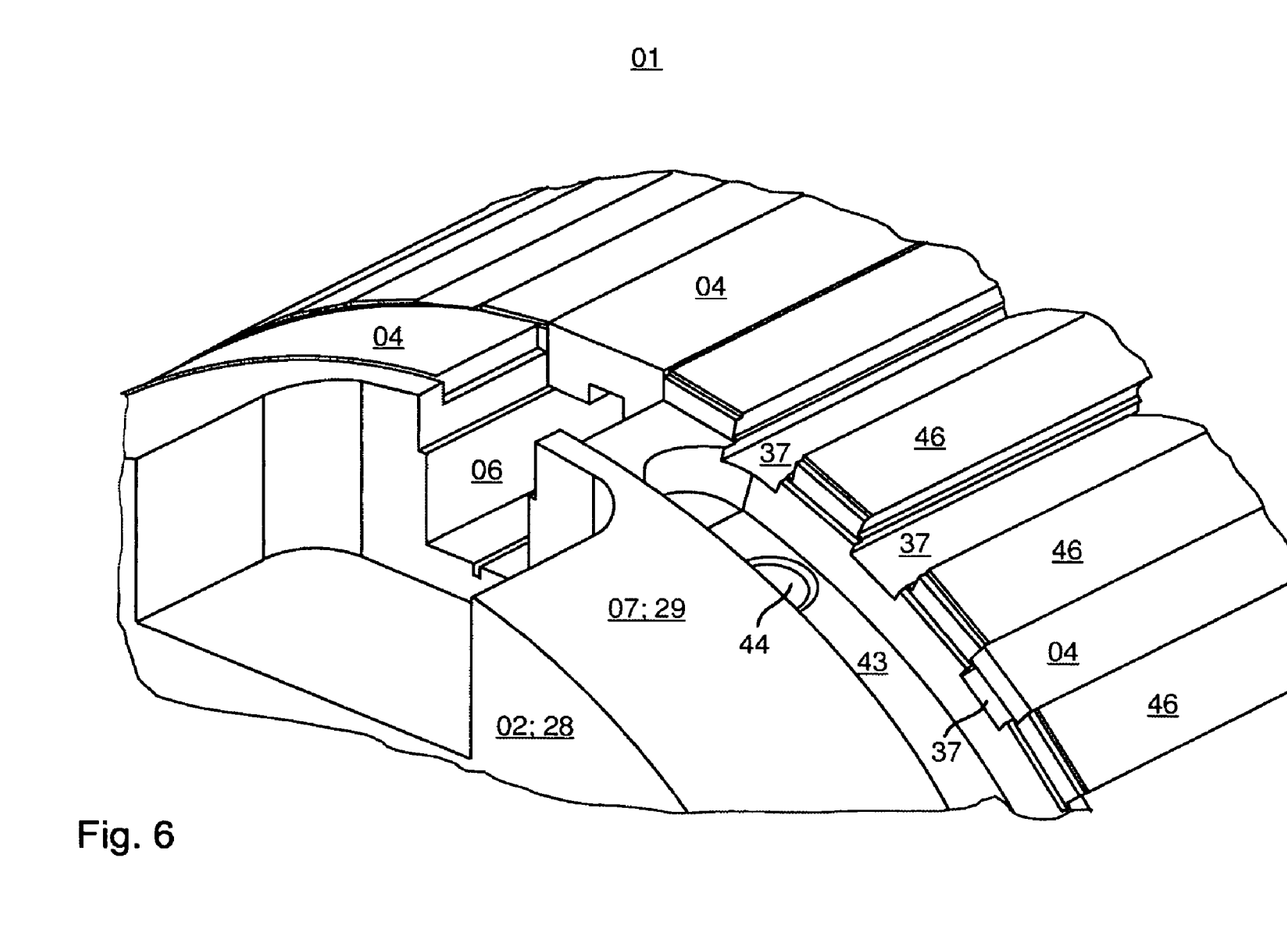
FIG. 6, a perspective plan view, partly in cross-section, of a rotating body, with flow channels formed in the barrel or in the base body, and where the flow channels and the bracing channel are each covered by a profiled body on the shell face of the barrel, or on the surface of the base body.

FIG. 6 shows a portion of the rotating body 01 in a perspective plan view. At least one bracing or securement channel 06, as well as several, preferably equidistantly spaced flow channels 37, provided, for example, in the form of rectangular grooves, have been formed extending axially with respect to the length of the rotating body 01 in the surface 07, 29 of its barrel 02 or base body 28. The bracing or securement channel 06, and the flow channels 37 on the surface 07, 29 of the barrel 02 or on the base body 28 are each covered by a profiled body 04, which is preferably configured in the form of a strip. For the sake of clarity, only a portion of the flow channel 37 has been covered in FIG. 6. Each profiled body 04, whose structural depth is less than the depth of the respective groove that is extending substantially radially into the barrel 02 or the base body 28, is preferably inserted, with a positive connection, into each one of the grooves and is connected in a material-to-material way, such as, in particular by the employment of the electron beam welding method, with the barrel 02 or the base body 28. In the operational state of the rotating body 01, a heat-carrying medium flows through the grooves, which have been embodied as flow channels 37, and which flow channels 37 are hermetically closed toward the surface 07, 29 of the barrel 07 or the base body 28 by the profiled body 04, while the bracing channel 06 is equipped with a holding device as shown by way of example in FIG. 1 and which is provided, at least in part, with a slit-shaped opening 11, that is not specifically represented, toward the opening 07, 29 of the barrel 02 or of the base body 28, produced, for example, by a milling process. At least some of the flow channels 37 are connected with each other, preferably close to an end face of the rotating body 01, for example by an annular groove 43 which is formed on the circumference of the barrel 02 or of the base body 28. This groove 43 is also hermetically sealed, preferably by an annular profiled body 04, toward the surface 07, 29 of the barrel 02 or of the base body 28. This annular profiled body 04 is preferably configured in the shape of a cylinder ring, or a shell, or as ring segments. One or several radial bores 44 can terminate, as the inflow or at the outflow of the heat-carrying medium, in this groove 43 which may be formed on the circumference of the barrel 02 or the base body 28.

Following the insertion and the fastening of the profiled bodies 04 in the respective grooves, the surface of the barrel 02 or of the base body 28 is preferably re-surfaced and/or ground and is subsequently protected against corrosion. The wear resistance of the surface 07, 29 of the barrel 02 or the base body 28 can also be improved, for example by the application of a protective layer, as was already described in connection with FIG. 3. With a barrel 02 which is constructed in layers, the corrosion-resistance and the wear resistance of the surface 29 of the base body 28 can preferably be improved. A for example, tube-shaped covering 36, constituting the shell face 07 of the rotating body 01, and which may be made of a preferably corrosion-proof and wear-proof material, is, for example, pushed on the surface 29 of the base body 28 and is welded there, for example to strips 46 which are formed between adjoining flow channels 37, preferably by electron beam welding, so that the profiled bodies 04, which were previously inserted into the surface 29 of the base body 28, are also covered. To the extent that at least the profiled body 04 covering the bracing channel 06 is made of a corrosion-resistant material, a dressing 03 arranged on the shell face 07 of the rotating body 01 comes exclusively into contact only with corrosion-proof surfaces.

While preferred embodiments of a method for the production of a rotating member and a rotating member of a printing press, in accordance with the present invention have been set forth fully and completely hereinabove, it will be apparent to one of skill in the art that various changes in, for example, the source of supply of the compressed fluid or the coolant liquid, the overall structure of the press, and the like could be made without departing from the true spirit and scope of the present invention which is accordingly to be limited only by the scope of the appended claims.

What is claimed is:

1. A rotating body useable in a printing press comprising:
   a rotating body barrel, said rotating body barrel having an outer shell face with an outer shell face surface;
   a groove formed in said outer shell face, said groove including joining surfaces spaced apart from each other in a circumferential direction of said rotating body barrel and adjacent said outer shell face surface, said groove extending in a radial direction into said rotating body barrel from said outer shell face, said groove having a groove depth in said radial direction; and a profiled body secured in said groove adjacent said outer shell face surface and being welded together with said outer shell face on said joining surfaces, said profiled body including an outer profiled body surface and having a profiled body structural depth, said profiled body structural depth being substantially less than said groove depth, said profiled body secured in said groove at least partially bridging said groove at said outer shell face surface of said rotating body barrel with said outer profiled body surface being located adjacent said outer shell face surface.

2. The rotating body of claim 1 wherein said groove is a flow channel adapted to receive a heat carrying flowable medium, said profiled body completely closing said groove off toward said outer shell face surface.

3. The rotating body of claim 1 including at least one dressing end holding means in said groove and further including a slit-shaped opening formed in said profiled body, said slit-shaped opening at least partially opening said groove toward said outer shell face surface.

4. The rotating body of claim 1 wherein said rotating body is arranged in a printing press.

5. The rotating body of claim 1 wherein said groove extends in an axial direction of said rotating body.

6. The rotating body of claim 1 wherein said groove extends at least partly in said circumferential direction of said rotating body.

7. The rotating body of claim 6 wherein said at least partly circumferentially extending groove is a flow channel and further including a plurality of axially extending flow channels connected to said circumferentially extending flow channel.

8. The rotating body of claim 1 wherein said profiled body is a molded element.

9. The rotating body of claim 1 wherein in an axial direction of said rotating body, said profiled body is shaped as a strip.

10. The rotating body of claim 1 wherein several of said profiled bodies are provided in an axial direction of said rotating body.

11. The rotating body of claim 1 wherein said profiled body is a corrosion-resistant material.

12. The rotating body of claim 11 wherein said profiled body is a corrosion-resistant steel.

13. The rotating body of claim 1 wherein at least a part of one of said joining surfaces close to said shell face has smooth walls without curvature in an axial direction of said rotating body.

14. The rotating body of claim 1 wherein said groove forms a securement channel with one of a round and a rectangular cross-section.

15. The rotating body of claim 1 wherein said rotating body barrel includes a base body having a surface and further including a cover on said base body surface and forming said outer shell face, said groove being formed in said base body and being covered at least partially, at said base body surface by said profiled body.

16. The rotating body of claim 1 wherein said profiled body is welded by electron beam welding.

17. The rotating body of claim 1 wherein said welding includes hard soldering in a vacuum.

18. The rotating body of claim 1 wherein said rotating body barrel is a corrosion-susceptible material.

19. The rotating body of claim 1 wherein said outer shell face is covered with a corrosion-proof protective layer.

20. The rotating body of claim 19 wherein said protective layer covers at least a part of a front face of said profiled body oriented toward said outer shell face.

21. A rotating body useable in a printing press comprising:
a rotating body barrel, said rotating body barrel having an outer shell face;
an axially extending groove formed in said outer shell face, said groove including a joining surface;
first and second profiled bodies in said groove, said profiled bodies each being welded to said rotating body barrel on said joining surface, said first and second profiled bodies being spaced apart from each other in a circumferential direction of said rotating body barrel;
a slit-shaped opening defined by a first edge of said first profiled body and a second edge of said second profiled body, said slit-shaped opening being located at said shell face;
a securement channel formed in said groove by said spaced apart first and second profiled bodies; and
at least one dressing end holding means pivotably positioned in said securement channel and having a dressing end holding portion adapted to hold a dressing arranged on said outer shell face, said dressing having a first dressing end in engagement with said first edge of said first profiled body and having a second dressing end in engagement with said second edge of said second profiled body, said dressing end holding portion of said at least one dressing end holding means being directly engageable with one of said first dressing end and said second dressing end.

22. The rotating body of claim 21 wherein said groove extends at least partly in said circumferential direction of said rotating body.

23. The rotating body of claim 22 wherein said at least partly circumferentially extending groove is a flow channel and further including a plurality of axially extending flow channels connected to said circumferentially extending flow channel.

24. The rotating body of claim 21 wherein said profiled body is a molded element.

25. The rotating body of claim 21 wherein in an axial direction of said rotating body, each of said first and second profiled bodies is shaped as a strip.

26. The rotating body of claim 21 wherein several of said first and second profiled bodies are provided in an axial direction of said rotating body.

27. The rotating body of claim 21 wherein each of said first and second profiled bodies is a corrosion-resistant material.

28. The rotating body of claim 27 wherein each of said first and second profiled bodies is a corrosion-resistant steel.

29. The rotating body of claim wherein at least a part of said joining surface close to said outer shell face has smooth walls without curvature in an axial direction of said rotating body.

30. The rotating body of claim 21 wherein said groove forms a securement channel with one of a round and a rectangular cross-section.

31. The rotating body of claim 21 wherein said rotating body barrel includes a base body having a surface and further including a cover on said base body surface and forming said outer shell face, said groove being formed in said base body and being covered at least partially, at said base body surface by said profiled body.

32. The rotating body of claim 21 wherein each of said first and second profiled bodies is welded by electron beam welding.

33. The rotating body of claim 21 wherein said welding includes hard soldering in a vacuum.

34. The rotating body of claim 21 wherein said rotating body barrel is a corrosion-susceptible material.

35. The rotating body of claim 21 wherein said outer shell face is covered with a corrosion-proof protective layer.

36. The rotating body of claim 35 wherein said protective layer covers at least a part of a front face of each of said first and second profiled bodies oriented toward said outer shell face.

37. A rotating body useable in a printing press comprising:
- a rotating body barrel, said rotating body barrel having an outer shell face;
- a plurality of axially extending grooves formed in said outer shell face, each of said plurality of axially extending grooves including joining surfaces spaced apart from each other in a circumferential direction of said rotating body barrel, each of said plurality of axially extending grooves having a groove depth in a radial direction of said rotating body barrel;
- a circumferentially extending groove formed in said outer shell face and forming a circumferential flow channel;
- a plurality of axially extending flow channels defined by selected ones of said plurality of axially extending grooves; and
- a profiled body in each of said plurality of axially extending grooves and being welded together with said rotating body barrel on said joining surfaces, said profiled body at least partially covering each of said plurality of axially extending grooves and having a profiled body structural depth less than said groove depth.

38. A rotating body useable in a printing press comprising:
- a rotating body barrel, said rotating body barrel having an outer shell face;
- a plurality of axially extending grooves formed in said outer shell face, each of said plurality of axially extending grooves groove including a joining surface;
- at least one circumferentially extending groove in said rotating body and forming a circumferentially extending flow channel;
- a plurality of axially extending flow channels formed by first selected ones of said plurality of axially extending grooves and being connected to said circumferentially extending flow channel;
- first and second profiled bodies in second selected ones of said plurality of axially grooves, said first and second profiled bodies being welded to said rotating body barrel on said joining surface and being spaced apart from each other in a circumferential direction of said rotating body barrel;
- a slit-shaped opening defined by said first and second profiled bodies and located at said outer shell face;
- a securement channel formed by said first and second profiled bodies; and
- at least one dressing end holding means in said securement channel and adapted to hold a dressing arranged on said outer shell face.

* * * * *

UNITED STATES PATENT AND TRADEMARK OFFICE
CERTIFICATE OF CORRECTION

PATENT NO. : 7,766,806 B2 Page 1 of 1
APPLICATION NO. : 10/532866
DATED : August 3, 2010
INVENTOR(S) : Martin Becker et al.

It is certified that error appears in the above-identified patent and that said Letters Patent is hereby corrected as shown below:

Column 12, claim 29, line 51, after "claim", insert -- 21 --.

Column 14, claim 38, line 6, after "grooves", delete "groove"; and line 15, after "axially", insert -- extending --.

Signed and Sealed this

Twenty-eighth Day of September, 2010

David J. Kappos
*Director of the United States Patent and Trademark Office*